United States Patent [19]

Tamura et al.

[11] 4,430,688
[45] Feb. 7, 1984

[54] SMALL HEAT RESISTANT FILM CONDENSER

[75] Inventors: Tooru Tamura, Ikeda; Nobuyuki Ojima, Katano; Hideaki Mochizuki, Higashiosaka; Ryuichi Souno, Moriguchi; Toshifumi Ikka, Osaka, all of Japan

[73] Assignee: Matsushita Electric Industrial Co., Ltd., Osaka, Japan

[21] Appl. No.: 487,415

[22] Filed: Apr. 28, 1983

Related U.S. Application Data

[63] Continuation of Ser. No. 224,924, Jan. 14, 1981, abandoned.

[51] Int. Cl.³ .......................... H01G 1/14; H01G 4/08
[52] U.S. Cl. ...................................... 361/307; 361/323
[58] Field of Search ............... 361/273, 307, 314, 322, 361/323

[56] References Cited

U.S. PATENT DOCUMENTS

| | | | |
|---|---|---|---|
| 2,497,066 | 2/1950 | Brennan | 361/322 X |
| 2,728,036 | 12/1955 | Steiner | 361/273 |
| 3,260,904 | 7/1966 | Booe | 361/322 X |
| 3,366,853 | 1/1968 | Rayburn | 361/307 |
| 3,522,496 | 8/1970 | Grahame | 361/314 X |
| 3,649,892 | 3/1972 | Booe | 361/323 |
| 3,854,075 | 12/1974 | Uhi | 361/307 |

FOREIGN PATENT DOCUMENTS 2255995  5/1974  Fed. Rep. of Germany ...... 361/307

*Primary Examiner*—Donald A. Griffin
*Attorney, Agent, or Firm*—Wenderoth, Lind & Ponack

[57] ABSTRACT

A film condenser formed of a solderable metal foil composed on one member 1 selected from the group consisting of copper, tin, and aluminum having a heat resistant plastic film 2 coated on one surface and a vapor-deposited metal film 3 on the surface of the heat resistant plastic film facing away from the metal foil. Two lead wires each having a part bent in the shape of a V or u with the open end facing laterally of the length of the wire and having a size to prevent solder in a molten state from flowing out of the bent part during soldering due to the surface tension of the molten solder are soldered to the other surface of the metal foil and to the surface of the metal film facing away from the plastic film.

12 Claims, 6 Drawing Figures

SMALL HEAT RESISTANT FILM CONDENSER

This application is a continuation of now abandoned application Ser. No. 224,924, filed Jan. 14, 1981.

This invention relates to a film condenser which entirely obviates the need for separator films, opposing electrode foils or electroding by spraying molten metal powder and so forth.

Generally, for wound type film condensers, a separator film is required. Winding of such a film is not only troublesome, but several types of foils should be wound in layers; accordingly, large gaps tend to develop which tends to reduce effective capacity per volume, thus imposed limitations on miniaturization of such condensers. Moreover, in order to attach lead wires after the film winding is accomplished, melt injections should be provided from sideways of the wound film, thereby forming the electrodes for the lead wires to be led out therefrom. This poses a great roadblock to the improvement in the reliability and workability of condensers.

The present invention is intended to solve these problems, and provides a condenser capable of being miniaturized without losing any of the good features of film condensers including the self-healing ability, high insulating resistance, small dielectric loss, etc., which is excellent for manufacture, and which permits automation and mechanization of the manufacturing process.

In the following, this invention is described in connection with an embodiment thereof and with reference to the accompanying drawings, in which.

Figure 1:
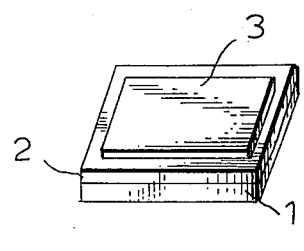
FIGS. 1 and 2 are perspective views for explaining the procedure for manufacturing the film condenser according to this invention.
Figure 3:
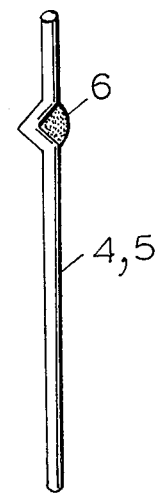
FIG. 3, is a view of one of the lead wires, one of the members of the film condenser.

As shown in FIG. 1, on the surface of a metal foil 1 of 10–50 μm thickness, a plastic material 2 which acts as a dielectric and which can withstand soldering temperatures is coated to a thickness of 1–5 μm. When the metal foil is aluminum, a γ type aluminum oxide film having a thickness of at least 50 Å can be formed prior to the coating with the dielectric. On the surface of the dielectric a metal layer 3 which acts as the opposite electrode is vapor-deposited. The film product obtained in this way is a film condenser stock with the metal foil 1 on the bottom surface and the vapor-deposited metal film 3 on the top surface arranged respectively constituting positive and negative electrodes, and the plastic film 2 therebetween constituting the dielectric. Lead wires are provided. To this end, two lead wires 4 and 5 are placed against the metal foil 1 and metal layer 3, respectively, from above and below. Thus, the lead wire 5 is placed on the metal foil 1, and the lead wire 4 on the vapor deposited metal film 3, these two lead wires being arranged parallel at a specified distance from each other. Thereafter, the two lead wires 4 and 5 are firmly secured to the respective foil and layer by soldering, thus forming a complete condenser.

The parts of the lead wires 4 and 5 respectively soldered onto the electrodes 1 and 3 are first bent into a V (or U) shape and then soldered. On account of the surface tension thereof, solder does not flow out of the bent portion, always stagnating at the bent parts of the lead wires, resulting in an enhanced adhesion of the lead wires onto the electrodes 1 and 3, and also in an increased resistance to twisting. Actually, in lead wires bent in the shape of V, as contrasted to lead wires which are straight shape, the resistance to twisting has been found to be improved by as much as about five times under identical soldering conditions. The tensile strength of the soldered construction is also about three times as great as for straight wires. Furthermore, in the process of soldering, the solder in the molten state gathers in the neighborhood of the bent parts of the lead wires due to its surface tension, and for this reason, there is no possibility of short-circuiting by solder crossing the electrodes.

Figure 2:
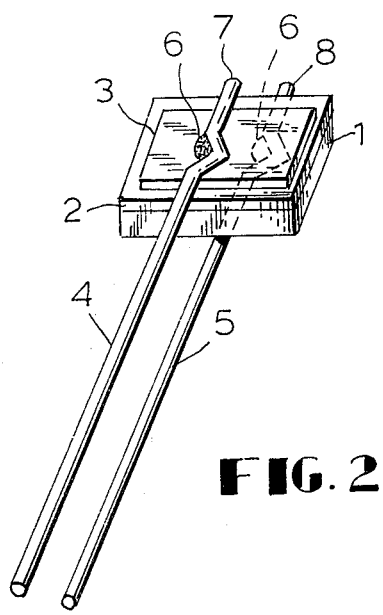

It is essential that the tip parts 7 and 8 of the lead wires 4 and 5 for the positive and negative electrodes, as FIG. 2 clearly shows, even if they are provided with sharp edge angles by cutting, should project part the metal foil, lest they inflict injury on the vapor-deposited metal layer or the film surface. Then, the condenser is completed by coating with an appropriate resin.

EXAMPLE 1

On an aluminum foil 20 μm thick, 5 mm wide and 5 mm long, polyphenylene oxide was coated to a thickness of 2 μm. On the surface of this coated oxide, an aluminum film was formed by vapor-deposition to a thickness of 2,000 Å. Then, on both the top and the bottom surfaces of the film product thus obtained, two lead wires 0.4 mm in diameter and 50 mm in length and having a solder for aluminum thereon, were, while being held at a distance of 3 mm from each other, were soldered respectively to the top and the bottom surfaces of the film product. The condenser obtained in this way was coated with epoxy resin to a thickness of 0.5 mm. This condenser had extremely favorable characteristics, its static capacity being 400 PF, tan δ 0.05% (at 1 kHz), an resistance greater than $5 \times 10^{13}$ Ω and a breakdown voltage higher than 250 V.

This condenser showed utterly no change in its electric characteristics even after it was left for a long while (1,000 hours) in a high temperature atmosphere at 125° C.

EXAMPLE 2

On an aluminum foil 20 μm thick, 5 mm wide and 5 mm long, a phenol-modified epoxy resin was coated to a thickness of 1.5 μm, and after the resin was set, polyphenylene oxide resin was applied thereon to a thickness of 2 μm. Thereafter, on this surface, an aluminum film was formed to a thickness of 2,000 Å by vapor deposition, thereby forming a film product. On both the top and the bottom surfaces of this film product, respective lead wires 0.4 mm in diameter and 50 mm in length were soldered 3 mm apart from each other in the direction of the length of the film product. The condenser obtained in this way was covered with a 0.5 mm thick coating of epoxy resin. This condenser had quite favorable characteristics with a static capacity at 350 PF; tan δ, 0.15% (at 1 kHz) an; insulating resistance, larger than $8 \times 10^{12}$ Ω; and a breakdown voltage higher than 300 V.

This condenser underwent no changes at all in its electrical characteristics even when being left for a long period (1,000 hours) in a high temperature atmosphere at 125° C.

Figure 4:
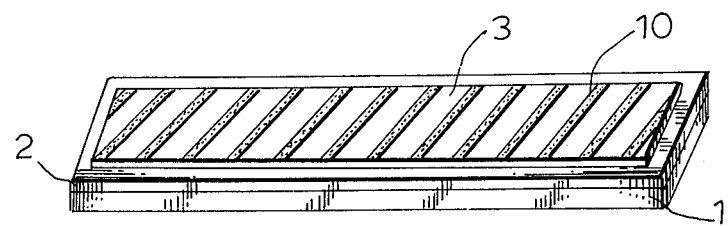
FIGS. 4 and 5 are views similar to FIGS. 1 and 2 showing the procedure for manufacturing a different form of film condenser according to the invention.
Figure 5:
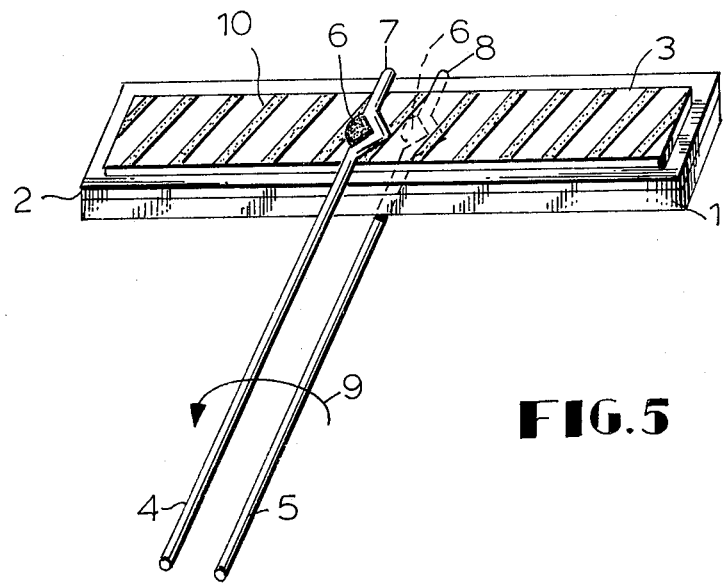

For manufacturing a condenser with a relatively large capacity, use of a long film product is necessary. Then, for the purpose of miniaturizing the finished condenser, as shown in FIG. 4, an insulating coating 10 is applied in the shape of fine oblique lines on the surface of the vapor-deposited metal film 3 of the long strip shape film product, after which, as shown in FIG. 5, a pair of lead wires 4 and 5 were arranged at the central part of the film product with the lead wire 4 being placed on the vapor-deposited metal film 3, and the lead wire 5 on the metal foil 1, and in contact therewith, respectively in the same manner as in FIG. 2. Then, with these two lead wires 4 and 5 as the center for winding, the film product is wound in the direction as indicated by the arrow 9, producing the condenser of the structure of FIG. 6. With regard to the distance between the lead wires 4 and 5, since the solder-applied holding parts of the lead wires are formed in the shape of a V or U, they need to be spaced more than three times the diameter of the lead wires. The depth of the U or V shaped part should preferably be on the same order as the lead wire diameter.

Figure 6:
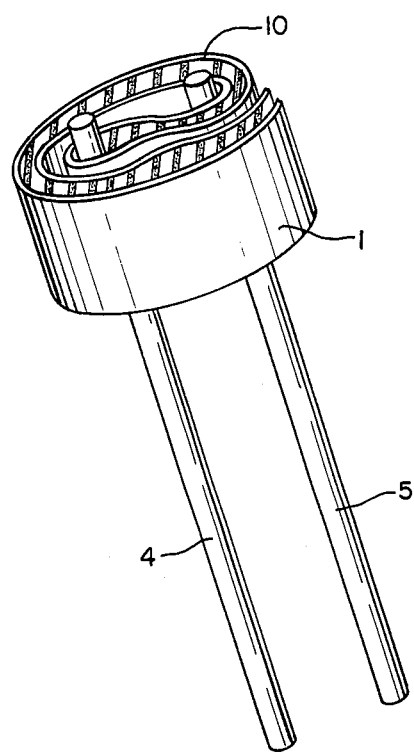
FIG. 6 is a perspective view of the film product of FIG. 5 wound for forming the condenser and prior to being coated with resin.

In the wound film structure of FIG. 6, the film product is wound with parts of the vapor-deposited metal electrode 3 always opposed to each other. In that configuration, the effect of the insulating coating 10 applied to the film product in the shape of fine oblique lines provides an adequate self-healing capability for the condenser, even if the vapor-deposited metal electrode 3 is broken down under high voltages resulting from existence of some defective portions of plastic film 2. As is obvious, the insulating coating 10, because it is applied in the shape of fine oblique lines, had substantially no effect on the solderability of lead wires 4 and 5.

This will become more evident from the following examples:

EXAMPLE 3

On an aluminum foil 20 μm thick, 5 mm wide and 110 mm long with a 2,000 Å thick γ-type aluminum oxide layer formed on its surface to be coated, polysulphone was coated to a thickness of 2.4 μm, and on the top surface of this coating, a vapor-deposited aluminum film 3.5 mm wide and 100 mm long was formed. On this long strip shaped film product, an insulating coating 0.1 mm wide and 0.005 mm thick was applied in the shape of oblique lines at intervals of 1.5 mm. Then, two lead wires 0.4 mm in diameter and 50 mm in length with V-shape bent portions in which a solder for aluminum was placed were placed on the film product at a distance of 2 mm from each other in the direction of the length of the film product. Thereafter, the film product was wound about these lead wires kept at the aforementioned distance. Subsequently, the assembly was subjected to a heat treatment at 280° C. for 2.5 seconds, thereby soldering the lead wires respectively to the metal foil and the vapor-deposited metal layer. The condenser obtained in that way was coated with epoxy resin.

The electrical characteristics achieved by this condenser were quite favorable, namely a static capacity of 3,800 PF; tan δ, 0.02% (the value taken at 1 kHz); insulating resistance, $6 \times 10^{14}$ Ω (the value when 50 V DC voltage is applied); and a break-down voltage higher than 500 V. Its size was 5.1 mm in height, 3.5 mm in width and 2.5 mm in thickness. Its electrical characteristics underwent virtually no changes, when it was left for 1,000 hours in a high temperature atmosphere at 125° C.

EXAMPLE 4

On an aluminum foil 20 μm thick, 5 mm wide and 25 m long, polyether sulphone was coated to a thickness of 2 μm. On the top surface of this coating, a vapor-deposited aluminum film was formed, and fine oblique lines of an insulating coating with 0.1 mm width and 0.005 mm thickness were applied at intervals of 1.5 mm. On this long strip shape film product, two lead wires with a 0.4 mm diameter and 50 mm length with V shape bent portions in which a solder for aluminum was placed were positioned at a distance of 2 mm from each other in the direction of the length of the product, which distance was kept unaltered an the film strip was wound into a condenser as shown in FIG. 6. Thereafter, the condenser was finished by soldering the lead wires to the metal foil and vapor-deposited metal layer by subjecting the assembly to a heat treatment at 250° C. for 3 seconds, and its exterior was coated with epoxy resin to a thickness 0.5 mm.

The electric characteristics of this condenser achieved were extremely favorable, namely a static capacity at 2,000 PF, tan δ 0.10% (the value taken at 1 kHz), insulating resistance larger than $8 \times 10^{13}$ Ω (the value obtained when a DC voltage of 50 V was impressed) and a break-down voltage higher than 250 V. Its size was 5.1 mm in height, 2.7 mm in width and 1.3 mm in thickness, and it a volume ratio of about 1/6–1/7, as compared with a condenser of the prior art which was formed by winding in lamination three types of film—an induction film, opposing electrodes and a separator. At times, even if a condenser is in a short-circulated state just after being assembled due to foreign materials deposited while being assembled or pinholes developed in the plastic film, the effect is obtained by applying a high voltage, for instance using a constant voltage, constant current DC power supply, regulated to 100 V and 5 mA, causing the aluminum vapor deposited on improper insulating parts to sublime and disappear. In this condenser, its electrical characteristics remained nearly as they were as above-described without undergoing deterioration.

The initial characteristics of this condenser were substantially unaltered even when it was left for a long time in a high temperature atmosphere at 125° C.

The above described examples clearly indicate that according to this invention, the condenser is formed by directly soldering lead wires on a sheet of film condenser stock. A large capacity condenser is formed by winding the stock from its central part. Thus a condenser can be produced by winding only a sheet of film without requiring a separator and opposing foil electrodes. Accordingly, the condenser can be miniaturized to a great degree, as compared with the prior art products. Moreover, because there is no need to inject molten metal for the electrode leads, of great improvement in the manufacturing process can be achieved. In the film condenser of this invention, the disadvantage of the prior art film condensers which were too big to be readily handled has been overcome, and the manufacturing complexities eliminated. Furthermore, with regard to its electric characteristics, because of the stability achieved by soldering of the lead wires, the outstanding features of conventional film condensers including excellent insulating property, small tan δ and self-healing ability are all preserved, and its stability at high temperature is excellent. When a heat resistant plastic film is coated on the γ-type aluminum oxide, as in example 3, the break-down voltage is doubled from that attained in conventional condensers.

Furthermore, according to this invention, the metal foil which constitutes one of the component materials is not limited to aluminum foil, but foils of copper, tin or nickel may be used, and for the plastic film coated on the metal foil, phenolic resins, epoxy resins, unsaturated polyester resins, diallyl phthalate resins, silicon resins, polyamide-imide resins, polysulfonic resins, polyphenyleneoxide base resins, polyether sulfonic resins, etc., which are generally said to be highly heat resistant plastics materials capable of withstanding soldering temperatures of 200°–280° C., are usuable. No special limitations are placed on the insulating coating applied in the configuration of oblique lines; use of any pliable electrically insulating coating is practicable.

What is claimed is:

1. A film condenser comprising: a film product having a solderable metal foil composed of one member selected from the group consisting of copper, tin and aluminum, a heat resistant plastic film coated on one surface of said solderable metal foil, and a vapor-deposited metal film on the surface of said heat resistant plastic film facing away from said metal foil; and
   two lead wires respectively soldered to the other surface of said solderable metal foil and to the surface of said vapor-deposited metal film facing away from said plastic film.

2. A film condenser according to claim 1, wherein said heat resistant plastic film is capable of withstanding soldering temperatures of 200°–280° C. and is composed of at least one member selected from the group consisting of phenolic resins, epoxy resins, unsaturated polyester resins, diallyl phthalate resins, polyphenylene oxide resins, and polyether sulfone resins.

3. A film condenser according to claim 2, wherein said film product is elongated and further comprises an insulating coating in fine oblique lines at equal angles in the widthwise direction on the surface of said vapor-deposited metal film, said lead wires being at the center parts of both surfaces of said film product and spaced from each other in the direction of the length of the film product a distance more than three times the lead wires diameter, said film product being wound around said lead wires for forming a wound film condenser.

4. A film condenser according to claim 1 wherein said solderable metal foil is composed of aluminum, and said film product further comprises a γ-type aluminum oxide layer thicker than 50 Å on said solderable metal foil and over which said plastic film is positioned.

5. A film condenser according to claim 4, wherein said film product is elongated and further comprises an insulating coating in fine oblique lines at equal angles in the widthwise direction on the surface of said vapor-deposited metal film, said lead wires being at the center parts of both surfaces of said film product and spaced from each other in the direction of the length of the film product a distance more than three times the lead wires diameter, said film product being wound around said lead wires for forming a wound film condenser.

6. A film condenser comprising: a film product having a solderable metal foil composed of one member selected from the group consisting of copper, tin and aluminum, a heat resistant plastic film on one surface of said solderable metal foil, and a vapor-deposited metal film on the surface of said heat resistant plastic film facing away from said metal foil; and
   two lead wires respectively soldered to the other surface of said solderable metal foil and to the surface of said vapor-deposited metal film facing away from said plastic film;
   wherein each of said lead wires has a bent portion at the part soldered to said film product, said bent part being in the shape of a V or a U with the open end facing laterally of the length of the wire and having a size to prevent solder in a molten state from flowing out of the bent part during soldering due to the surface tension of the molten solder.

7. A film condenser according to claim 6, wherein said heat resistant plastic film is capable of withstanding soldering temperatures of 200°–280° C. and is composed of at least one member selected from the group consisting of phenolic resins, epoxy resins, unsaturated polyester resins, diallyl phthalate resins, polyphenylene oxide resins, and polyether sulfone resins.

8. A film condenser according to claim 7, wherein said film product is elongated and further comprises an insulating coating in fine oblique lines at equal angles in the widthwise direction on the surface of said vapor-deposited metal film, said lead wires being at the center parts of both surfaces of said film product and spaced from each other in the direction of the length of the film product a distance more than three times the lead wires diameter, said film product being wound around said lead wires for forming a wound film condenser.

9. A film condenser according to claim 6, wherein said solderable metal foil is composed of aluminum, and said film product further comprises a β-type aluminum oxide layer thicker than 50 Å on said solderable metal foil and over which said plastic film is positioned.

10. A film condenser according to claim 9, wherein said film product is elongated and further comprises an insulating coating in fine oblique lines at equal angles in the widthwise direction on the surface of said vapor-deposited metal film, said lead wires being at the center parts of both surfaces of said film product and spaced from each other in the direction of the length of the film product a distance more than three times the lead wires diameter, said film product being wound around said lead wires for forming a wound film condenser.

11. A film condenser according to claim 6, wherein said film product is elongated and further comprises an insulating coating in fine oblique lines at equal angles in the widthwise direction on the surface of said vapor-deposited metal film, said lead wires being at the center parts of both surfaces of said film product and spaced from each other in the direction of the length of the film product a distance more than three times the lead wires diameter, said film product being wound around said lead wires for forming a wound film condenser.

12. A film condenser comprising: a film product having a solderable metal foil composed of one member selected from the group consisting of copper, tin and aluminum, a heat resistant plastic film coated on one surface of said solderable metal foil, and a vapor-deposited metal film on the surface of said heat resistant plastic film facing away from said metal foil; and
   two lead wires respectively soldered to the other surface of said solderable metal foil and to the surface of said vapor-deposited metal film facing away from said plastic film;
   wherein said film product is elongated and further comprises an insulating coating in fine oblique lines at equal angles in the widthwise direction on the surface of said vapor-deposited metal film, said lead wires being at the center parts of both surfaces of said film product and spaced from each other in the direction of the length of the film product a distance more than three times the lead wires diameter, said film product being wound around said lead wires forming a wound film condenser.

* * * * *